(12) United States Patent
Jong

(10) Patent No.: US 12,019,467 B2
(45) Date of Patent: Jun. 25, 2024

(54) ESTIMATION OF EVENT GENERATION TIMES TO SYNCHRONIZE RECORDATION DATA

(71) Applicant: Click Therapeutics, Inc., New York, NY (US)

(72) Inventor: Chang-Han Jong, Chappaqua, NY (US)

(73) Assignee: Click Therapeutics, Inc., NY (US)

( * ) Notice: Subject to any disclaimer, the term of this patent is extended or adjusted under 35 U.S.C. 154(b) by 157 days.

(21) Appl. No.: 17/670,768

(22) Filed: Feb. 14, 2022

(65) Prior Publication Data
US 2023/0259156 A1 Aug. 17, 2023

(51) Int. Cl.
G06F 1/12 (2006.01)
G06F 1/10 (2006.01)
H04J 3/06 (2006.01)

(52) U.S. Cl.
CPC ............ *G06F 1/12* (2013.01); *G06F 1/10* (2013.01); *H04J 3/0679* (2013.01); *H04J 3/0685* (2013.01)

(58) Field of Classification Search
CPC .. G06F 1/12; G06F 1/10; H04J 3/0679; H04J 3/0685
See application file for complete search history.

(56) References Cited

U.S. PATENT DOCUMENTS

| 8,050,881 | B1 | 11/2011 | Yeung et al. |
| 8,719,452 | B1 * | 5/2014 | Ding ................ H04N 21/4344 709/248 |
| 2012/0151093 | A1 | 6/2012 | Zheng |
| 2014/0278496 | A1 | 9/2014 | Spencer |
| 2021/0013981 | A1 | 1/2021 | Ueda |

FOREIGN PATENT DOCUMENTS

| WO | WO-2008/101211 A2 | 8/2008 |
| WO | WO-2012/163360 A1 | 12/2012 |

OTHER PUBLICATIONS

Hashing—Cybersecurity Glossary, retrieved from the internet at <https://web.archive.org/web/20201227111457/https://cybersecurityglossary.com/hashing/> (Year: 2020).*
International Search Report and the Written Opinion on PCT Appl. Ser. No. PCT/US2022/016281 dated Sep. 19, 2022 (14 pages).

* cited by examiner

*Primary Examiner* — Stefan Stoynov
(74) *Attorney, Agent, or Firm* — Foley & Lardner LLP

(57) ABSTRACT

Provided herein are systems and methods of determining times of events. A server may receive a message from a client in response to an event. The message may identify a first time corresponding to a generation of the event and a second time corresponding to transmission of the message. The first time and the second time may be determined using a first clock of the client. The server may identify, using a second clock of the server, a third time at which the message is received at the server. The server may determine a fourth time based at least on the first time, the second time, and the third time. The fourth time may identify a time according to the second clock at which the event was generated at the client.

36 Claims, 8 Drawing Sheets

ESTIMATION OF EVENT GENERATION TIMES TO SYNCHRONIZE RECORDATION DATA

BACKGROUND

A computing device may maintain a system clock to keep track of time. Various processes on the computing device may be defined relative to the time of the system clock.

SUMMARY

Across a networked environment, there may be a multitude of computing devices, with each device using its own system clock to measure time. The time on the system clock may be used to reference various processes, threads, or events that are processed or detected on the device. Even with a mechanism to synchronize times (e.g., using a centralized time server), the times on the system clocks across the multitude of devices may deviate from one another due to physical constraints (e.g., a clock skew in a crystal on the local clock) or a configuration error (e.g., time zone setting). The clocks on devices not connected with the network or lacking capabilities of synchronizing such a server may drift away from the correct time. As a result, the time measured on one computing device may differ the time measured on another computing device. This discrepancy in the times may be problematic when attempting to measure the actual time of a single event. With multiple measured times, it may be uncertain as to which is the correct time and how to resolve the discrepancies among such times. In certain applications, the accuracy and preciseness of time measurements for such events across different computing devices may be vital to proper operations and functioning.

In the context of digital therapeutics, a single user may use applications installed across multiple devices that provide lessons specifying that the user is to perform various routines aimed at tackling a behavioral condition of the user. Each device may detect an event (e.g., a user interaction indicating completion of a routine) with the application thereon. The device may send a record associated with the event including the time of the event to a server. Under some scenarios (also referred herein as "offline-first"), the device may be initially disconnected from the network, and may send the record once connected. With receipt from multiple devices, the server may aggregate the record associated with the detected events. The information from the aggregated records may be used to evaluate to assess the efficacy of the lessons provided via the digital therapeutics applications. The information may include a time at which the lesson was completed or a beginning and an end time of the lesson. Inaccurate or imprecise times may be deleterious to the assessment and by extension proper configuration of the digital therapeutics application to improve the lessons, especially for a particular user.

One approach at resolving the issue of discrepancies in time measurements may include use of the Lamport timestamp. Under the Lamport timestamp, a logical clock may be used to determine a sequence of the detected events of a particular type of event in the computer networked environment. The algorithm may rely on different computing devices without synchronized clocks to infer a partial sequence of the events, and resolve which event is to take precedence over another event. One problem may be that this approach does not consider the offline-first scenario, with unconnected devices later reconnecting with the network. Furthermore, this approach may not estimate the actual times of the detected events.

Another approach at resolving this problem may rely on time of receipt or synchronization with a given computing device to resolve the aggregated records. For example, the server may identify a time of receipt for each record received from the computing devices. The record may be for a particular type of event, such as a user interaction with a user interface indicating completion of a routine via the application. From a given set of records for the same type of event for a user, the server may select the record (also referred herein as the winning record) with the earliest or latest time of receipt. This resolution technique, however, may not consider address the offline-first scenario, and may not determine the actual times of the events.

To address these and other challenges, the server of a log interpreter system may be configured to estimate a time corresponding to the occurrence of the event at a client relative to the time kept track on the server's clock. Upon detection, the client may use its own clock to identify an event detection time ($T_A$) corresponding to the occurrence of the event. In the context of a digital therapeutics application, the event may correspond to a user interaction indicating that the user has completed a lesson or a routine of the lesson. The client may or may not be initially connected with the network. When network connection becomes available, the client may send a message to the server. The message may include a unique identifier for the client (also referred herein as a UUID), a timestamp for the event detection time measured on the client's clock ($T_A$), and another timestamp for a transmission time identifying when the client transmitted the message ($T_B$). The message may also include information regarding the event or routine, such as: a key identifying the event, data associated with the performance of the routine or lesson, and a hash value for the message, among others.

With receipt from the client, the server may use its own clock to identify the time of receipt of the message ($T_C$). The server may also parse the message to extract the event detection time ($T_A$) and the transmission time ($T_B$), both still measured in accordance with the clock of the client. The time as measured on the clock of the client may be unsynchronized or differ from the time as measured on the clock of the server. In addition, if the times recorded by the client are in a different time zone or version, the server may normalize the times to the time zone and version used by the server. To estimate the amount of time elapsed between the detection of the event and transmission on the client, the server may determine a difference ($T_B-T_A$) between the event detection time ($T_A$) and the transmission time ($T_B$). With the determination, the server may compare the difference ($T_B-T_A$) with the time of receipt on the server ($T_C$) to estimate the time of the occurrence of the event relative to the server's clock ($T_D=T_C-(T_B-T_A)$).

The event detection time as measured by the server ($T_D$) may be more accurate than the event detection time as measured by the client ($T_A$) on at least a number of grounds. For one, the clock of the server may be more frequently synchronized to a time server, and may thus be more accurate and precise relative to the clock of the client, which may have been disconnected from the network. For another, the clock of the server may be agnostic or independent to any particular time zone or clock version used by the clients, and as such the estimated times may not be reliant on the particular time zones or versions.

Using the estimated times, the server of the log interpreter system may resolve multiple records of events detected across various clients. In the context of digital therapeutics applications, a single user may be using multiple clients to log on and run the applications to access the lessons. Given this setting, the user may perform same routines or different routines linked with the same lesson presented via the application, and the recordation of these routines may correspond to events. As a result, the messages arising from the performance of these routines may have keys identifying that the events are associated. When the server identifies these messages with such keys as associated, the server may resolve the corresponding events by determine a sequence of the events in accordance with the estimated times of occurrence ($T_D$) as calculated by the server. Even if the message for a first event is received well after the message for a subsequent, associated second event ($T_{C1} > T_{C2}$), the server may be able to determine the sequence using the times of occurrences for both events ($T_{D1}$, $T_{D2}$). Using the times, the server may determine that the first event precedes the second event ($T_{D1} < T_{D2}$). With the determination of the sequence, the server may store the records for these events on the log database. In some embodiments, the client may also perform the resolution of events by determining the sequence of events in a similar manner using the estimated times of occurrence.

In this manner, by using its own clock rather than relying on the measurements using the client's clocks, the server may be able more accurately and precisely calculate the actual time of the occurrence of each of the events on the clients. Using these more accurate and precise estimates, the server may resolve associated events by determining the sequence of such events. The server may in turn store records of these events on the database thereby improving the reliability and usefulness of the recorded data. Since the recorded data regarding these events are more accurate and precise, the assessments of the applications on the clients may also be more accurate and reflective of how users actually use the applications.

These evaluations may be used to reconfigure and update applications to improve user experience. For example, an administrator of a digital therapeutics application may use the records to better analyze how effective the routines of the lessons are in addressing behavioral conditions of users. The updates to the application may reduce the consumption of computing resources and network bandwidth, such as those used on presenting lessons identified as ineffective. In addition, the reconfigurations may increase the quality of human-computer interactions (HCI) between the user and the application.

Aspects of the present disclosure are directed to system, methods, and computer readable media for determining times of events. A server may receive a message from a client in response to an event. The message may identify a first time corresponding to a generation of the event and a second time corresponding to transmission of the message. The first time and the second time may be determined using a first clock of the client. The server may identify, using a second clock of the server, a third time at which the message is received at the server. The server may determine a fourth time based at least on the first time, the second time, and the third time. The fourth time may identify a time according to the second clock at which the event was generated at the client.

In some embodiments, the message may be a first message from a first client in response to a first event, the client may be the first client, and the event may be the first event. In some embodiments, the server may determine, for a second message in response to a second event from a second client associated with the client, based at least on (i) a fifth time corresponding to a generation of the second event according to a third clock of the second client, (ii) a sixth time corresponding to transmission of the second message according to the third clock, and (iii) a seventh time at which the second message is received at the server determined using the second clock, an eighth time. The eighth time may identify a time according to the second clock at which the second event was generated at the second client.

In some embodiments, the server may determine a sequence of the first event and the second event based at least on (i) the fourth time and (ii) the eighth time according to the second clock. In some embodiments, the server may store, in a log for the first client on the database, a second record identifying the second client, the second event, and the eighth time, responsive to an association between the first client and the second client. In some embodiments, the server may determine a precedence for resolution between the first event and the second event based at least on the fourth time and the eighth time, responsive to identifying that the first message and the second message as having a matching key.

In some embodiments, the server may receive a second message in response to a second event from a second client associated with the client. In some embodiments, the server may identify the first event and the second event as corresponding to a routine, responsive to the first message and the second message having a matching key for the routine. In some embodiments, the server may provide a second message to a second client device associated with the client device. The second message may identify the event and the fourth time.

In some embodiments, the server may receive the message from the client, responsive to the client establishing a connection with a network with which the server is communicatively coupled. In some embodiments, the server may receive the message generated by an application on the client in response to the event. The application may provide a plurality of routines to address a condition of a user. The event may correspond to performance of at least one of the plurality of routines. In some embodiments, the record may identify a key for the event, a payload of the message, a tag associated with the payload, and a hash value generated by the client for the event.

Aspects of the present disclosure are directed to system, methods, and computer readable media for determining times of events. A client may identify, in response to an event, a first time corresponding to a generation of the event and a second time corresponding to transmission of a message sent to a server to identify the event. The first time and the second time may be determined using a first clock of the client. The client may receive a third time at which the message is received at the server. The third time may be determined using a second clock of the server. The client may determine a fourth time based at least on the first time, the second time, and the third time. The fourth time may identify a time according to the second clock at which the event was generated at the client. The client may store, on a database, an association between the event and the fourth time.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following enumeration of the sections of the specification and their respective contents may be helpful:

Section A describes embodiments of systems and methods of determining times of events generated on clients; and Section B describes a network and computing environment which may be useful for practicing embodiments described herein.

A. System and Method for Determining Times of Events Generated on Clients

Figure 1:
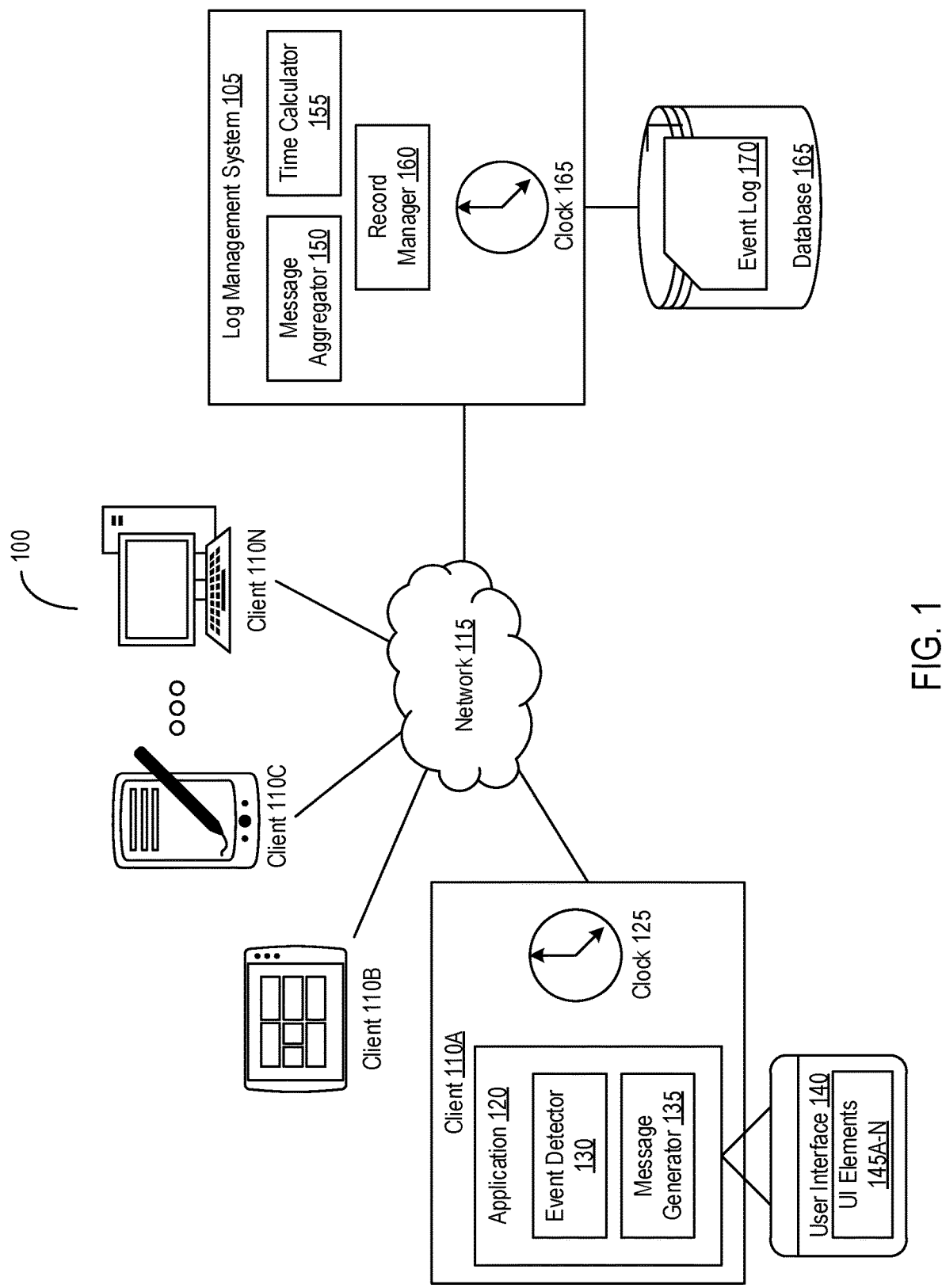
FIG. 1 depicts a block diagram of a system for determining times of events generated on clients in accordance with an illustrative embodiment.

Referring now to FIG. 1, depicted is a block diagram of a system 100 for determining times of events generated on clients. In overview, the system 100 may include at least one log management system 105 (sometime herein referred to as a server) and a set of clients 110A-N (hereinafter generally referred to as clients 110). The log management system 105 and one or more of the clients 110 may be communicatively coupled via at least one network 115. At least one client 110 (e.g., the first client 110A as depicted) may include at least one application 120 and at least one clock 125, among others. The application 120 may include at least one event detector 130 and at least one message generator 135, among others. The application 120 may also include or provide at least one user interface 140 including one or more user interface (UI) elements 145A-N (hereinafter generally referred to as UI elements 145). The log management system 105 may include at least one message aggregator 150, at least one time calculator 155, at least one record manager 160, and at least one clock 165, among others. The log management system 105 may include or access at least one database 165. The database 165 may store, maintain, or otherwise include at least one event log 170. Each of the components in the system 100 (e.g., the log management system 105 and its components and each client 110 and its components) may be executed, processed, or implemented using hardware or a combination of hardware, such as the system 400 detailed herein in Section B.

In further detail, the application 120 executing on the client 110 may present or provide the user interface 140 including the one or more UI elements 145 to a user of the client 110 in accordance with a configuration on the application 120. The UI elements 145 may correspond to visual components of the user interface 140, such as a command button, a text box, a check box, a radio button, a menu item, and a slider, among others. In some embodiments, the application 120 may be a digital therapeutics application, and may provide one or more lessons via the user interface 140 to address at least one behavioral condition of the user. The behavioral condition may include, for example, smoking cessation, alcohol overconsumption, dietary behavior, and disorders, among others, on the part of the user. Each lesson may include a set of routines identifying one or more activities that the user is to carry out as part of addressing the behavioral condition. The routines may include, for example, walking for a set amount of time, a breathing exercise, using a nicotine gum, and responding to a message prompt, among others. The application 120 may present the lessons via the UI elements 145 of the user interface 140. For example, at a specified time, the application 120 may display a message prompting the user to perform a breathing exercise.

Figure 2A:
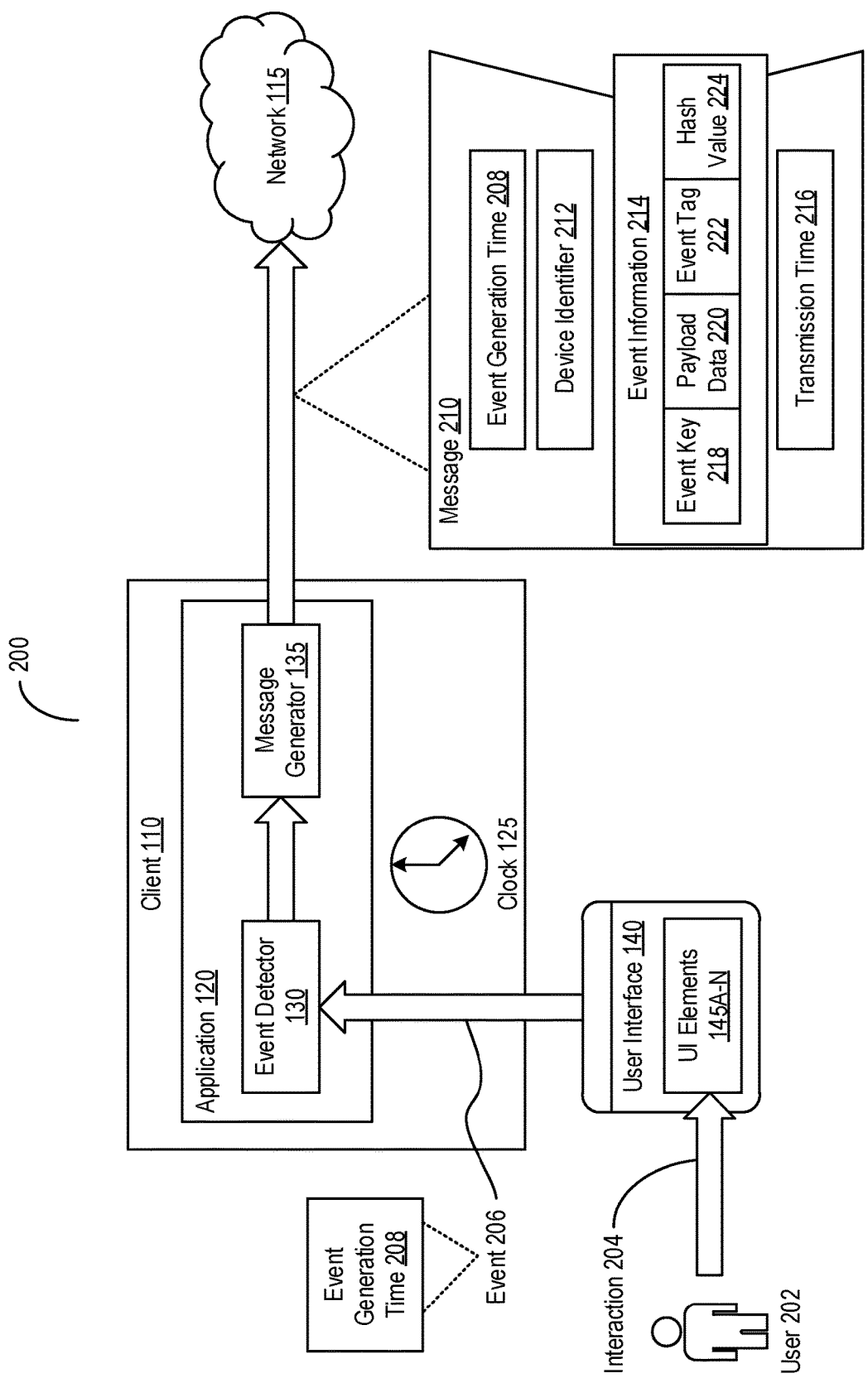
FIG. 2A depicts a block diagram of a process for generating messages in the system for determining times of events in accordance with an illustrative embodiment.

Referring now to FIG. 2A, among others, depicted is a block diagram of a process 200 for generating messages in the system 100 for determining times of events. The process 200 may correspond to operations in the system 100 for sending a message in response to a generation of an event. Under the process 200, a user 202 of the application 120 may perform at least one interaction 204 with one or more of the UI elements 145 of the user interface 140 provided by the application 120. The interaction 204 may include an entry or input with a corresponding UI element 145 made via an input/output (I/O) component of the client 110, such as a touchscreen, a mouse, or a keyboard, among others. For instance, upon the completion of a routine specified by a prompt displayed via the application 120, the user 202 may press with a button indicating completion of the routine in a lesson, using the mouse or touchscreen.

The event detector 130 of the application 120 executing on the client 110 may monitor for one or more interactions 204 from the user 202 with one or more of the UI elements 145 of the user interface 140 provided by the application 120. For example, the event detector 130 may monitor for the interactions 204 using an event listener or handler in the corresponding UI element 145 of the user interface 140. Upon detection of the interaction 204, the event detector 130 may produce, output, or otherwise generate at least one event 206 for the interaction 204. In some embodiments, the event detector 130 may identify or determine whether the detected interactions 204 correspond to a defined set of interactions. For example, the defined set may specify a sequence or combination of interactions corresponding to a completion of a routine in the lesson provided by the application 120. When the interactions 204 do not match the defined set of interactions, the event detector 130 may refrain from generating the event 204. Otherwise, when the interactions 204 match the defined set, the event detector 130 may generate the event 204. For instance, the event detector 130 may generate the event 206 upon detecting a set of interactions 204 associated with a completion of a routine in the lesson provided via the application 120 to address a behavioral condition of the user 202.

With the generation, the event detector 130 may determine or identify an event generation time 208 for the event 206 using the clock 125 on the client 110. The clock 125 may keep track of time on the client 110 for various processes thereon. The event generation time 208 may correspond to a time at which the event 206 was generated or the associated interactions 204 were detected. The clock 125 may be, for example, an electronic oscillator, a programmable interval timer (PIT), or a crystal oscillator, among others. In some embodiments, upon generation of the event 206, the event detector 130 may invoke the clock 125 to retrieve or identify the current time. The event detector 135 may use the identified time as the event generation time 208 corresponding to the generation of the event 206. The event generation time 208 may be a timestamp in any format. For example, the timestamp for the event generation time 208 may be in accordance with the ISO 8601 format, and may be in the form of "[Year]-[Month]-[Date] [Time Zone] [Hour]:[Minute]:[Second]." The timestamp may be in the time zone used by the clock 125 on the client 110, and the time zones may differ among the clients 110. With the identification, the event detector 130 may store and maintain an association between the event generation time 208 and the event 206 on the client 110. The event detector 130 may also relay or provide the event 206 and the event generation time 208 to the message generator 135.

The message generator 135 of the application 120 executing on the client 110 may generate at least one message 210 for the event 206 to send to the log management system 105 via the network 115. The message 210 may identify or include: the event generation time 208 determined using the clock 125 of the client 110; a device identifier 212 for the client 110; event information 214 identifying data associated with the event 206; and a transmission time 216 corresponding to a time at which the message 210 is transmitted, among others. To generate, the message generator 135 may identify the event generation time 208 determined using the clock 125 of the client 110 to include into the message 210. The message generator 135 may also identify the device identifier 212 on the client 110 or from the application 120. The device identifier 212 may uniquely reference or correspond to the client 110 itself (e.g., a universally unique identifier (UUID) or globally unique identifier (GUID)), the instance of the application 120 on the client 110, or the user 202 of the client 110 (e.g., as an account identifier), among others. In some embodiments, the device identifier 212 may have been assigned by the log management system 105 to the client 110, the application 120, or the user 202, and stored and maintained on the client 110.

In addition, the message generator 135 may determine or generate the event information 214 for the event 206 to include into the message 210. The event information 214 may identify or include one or more of: at least one event key 218, at least one payload data 220, at least one event tag 222, and at least one hash value 224, among others. The event key 218 may be an identifier for the event 206. For example, the event key 218 may identify the routine corresponding to the interaction 204 or the lesson provided via the application 120 associated with the generation of the event 206. The payload data 220 may include various metrics or other data associated with the event 206. For instance, the payload data 220 may include biometrics of the user 202 for the exercise as prompted by the application 120 via the user interface 140. The biometric data included in the payload data 220 may include a temperature, a heart rate, and a breathing rate, among others. The payload data 220 may also identify a device type for the client 110, such as a laptop, a smartphone, a smart television, and desktop, among others.

Continuing on, the event tag 222 (sometimes herein referred to as an event label) may identify or include metadata associated with the event 206. The event tag 222 may be used to classify the events for searching a record for the event 206. For example, the application developer of a digital therapeutics application may include a level of difficulty in the event tag 222, such as "beginner," "intermediate," and "advanced" tags, among others. Another application developer of another digital therapeutics application may include section tags, such as "section 1," "section 2," and "section 3," among others. These event tags 222 may be used to indicate a progress of a user in a particular section of a set of routines. The event tags 222 may also facilitate searching or filtering of events 206 and related data for processing (e.g., using non-relational or non-SQL techniques).

The hash value 224 may identify or include a unique value identifying the generation of the event 206 at the client 110. The message generator 135 may apply a hash function on data associated with the event 206 to generate the hash value 224. The hash function may include, for example, a cyclic redundancy check (CRC), a checksum function, a universal hash function, and a cryptographic hash function (e.g., hash-based message authentication code (HMAC) or Secure Hash Algorithm (SHA)), among others. The hash value 224 may be used to facilitate the use of a bloom filter, when data corresponding to the event 206 is stored on the database 165. The data to which the hash function is applied may include at least a portion of the contents in the message 210, such as the event generation time 208, the device identifier 212, the event key 218, the payload data 220, the event tag 222, and the transmission time 216, among others.

With the identifications, the message generator 135 may determine whether to send, provide, or otherwise transmit the message 210 to the log management system 105 over the network 115. In certain circumstances, the client 110 may have been disconnected from the network 115 or otherwise not communicatively coupled with the log management system 105, when the interaction 204 is detected or the event 206 is generated. For example, the client 110 along with the user 202 may be physically situated in a locale outside the range of cellphone tower coverage, and thus unable to access the network 115. Until the client 110 is moved within range of the cellphone coverage, the message generator 135 may be unable to send the message 210 via the network 115. With the generation of the event 206, the message generator 135 may identify or determine whether the client 110 is connected with the network 115 or the log management system 105. If the connectivity with the network 115 or the log management system 105 is unavailable, the message generator 135 may refrain from generation and transmission of the message 210. In addition, the message generator 135 may continue monitoring for connectivity between the client 110 and the network 115 or the log management system 105, and may repeat the determination.

Conversely, if the connectivity with the network 115 or the log management system 105 is determined to be available, the message generator 135 may determine that the message 210 is to be sent, and may initiate sending of the message 210. In conjunction with the transmission, the message generator 135 may use the clock 125 on the client 110 to determine or identify the transmission time 216 corresponding to the sending of the message 210. The message generator 135 may invoke the clock 125 to retrieve or identify the current time. With the identification, the message generator 135 may use the time as the transmission time 216. The transmission time 216 may be a timestamp in any format. For example, the timestamp for the transmission time 216 may be in accordance with the ISO 8601 format, similar to the event generation time 208 described above. The message generator 135 may include the transmission time 216 into the message 210. With the inclusion, the message generator 135 may send the message 210 to the log management system 105 via the network 115.

Figure 2B:
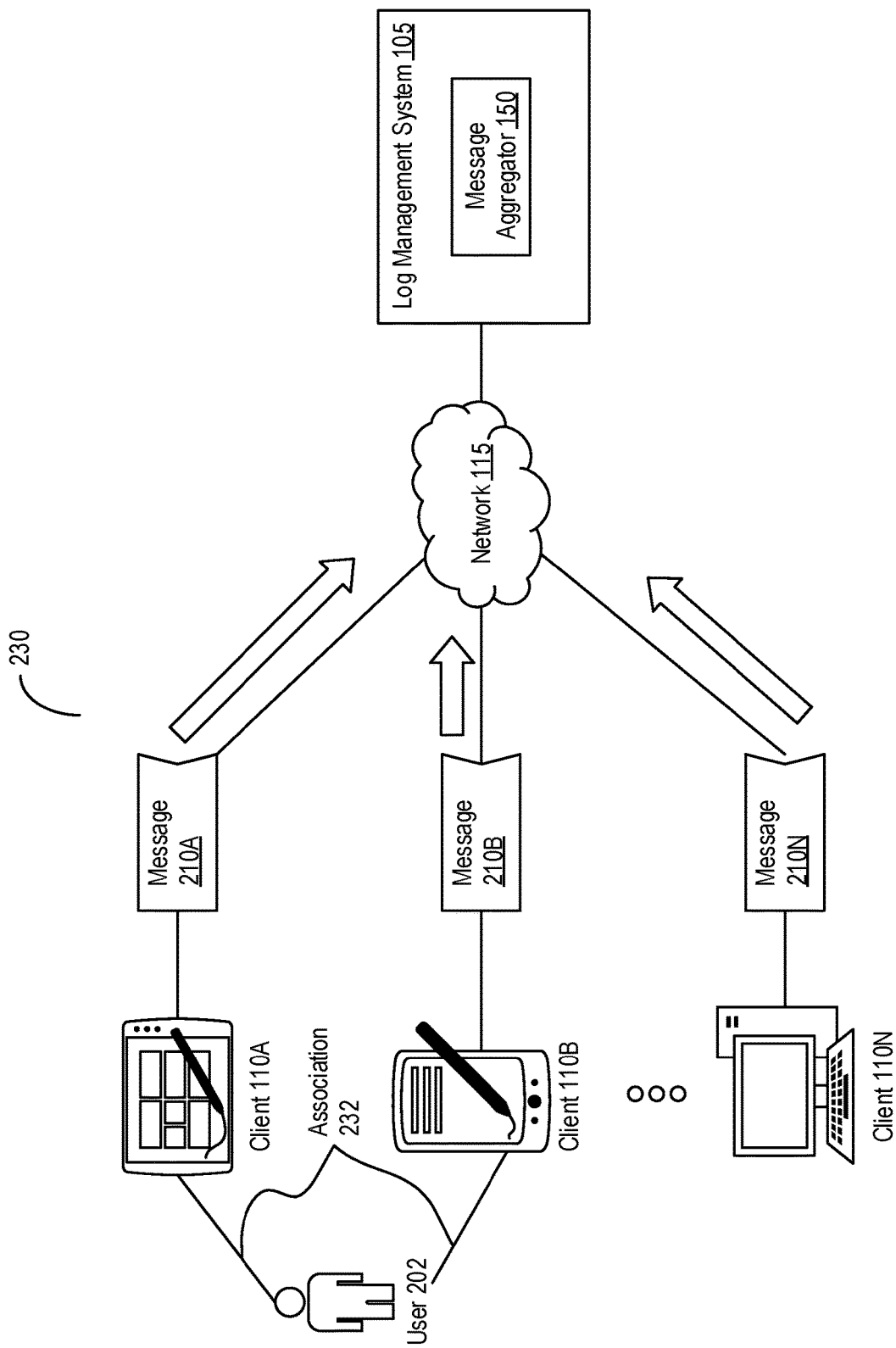
FIG. 2B depicts a block diagram of a process for receiving messages from multiple clients in the system for determining times of events in accordance with an illustrative embodiment.

Referring now to FIG. 2B, among others, depicted is a block diagram of a process 230 for receiving messages from multiple clients 110 in the system 105 for determining times of events. The process 230 may correspond to operations in the system 100 for receiving messages 210A-N (hereinafter generally referred to as messages 210) from multiple clients 110. Under the process 230, each of the one or more the clients 110 may be sending a respective message 210 to the log management system 105. At least two of the clients 110 (e.g., the first client 110A and the second client 110B as depicted) may have an association 232 with one user 202. By extension, the messages 210 from these clients 110 (e.g., the first message 210A and the second message 210B) may also have the association 232. In general, the association 232 may indicate the user 202 is using the applications 120 on the two clients 110. For example, the user 202 may be logged onto the application 120 on each of the two clients 110 using the same authentication information (e.g., account identifier and passcode), and may operating the application 120 on either client 110 at a given time. The association 232 may also identify that the events 206 generated on each client 110 are associated with a particular routine or lesson provided by the application 120. For instance, the user 202 may be performing various routines as directed in the lessons presented via the user interface 140 of the application 120 on either client 110. When the event 206 is detected, each client 110 may generate and send the message 210 for the event 206 to the log management system 105 in the manner detailed above. The association 232 between messages 210 may be indicated or inferred from the event information 214 in each message 210, as will be detailed herein.

The message aggregator 150 executing on the log management system 105 may retrieve, identify, or otherwise receive each message 210 from the corresponding clients 110. In some embodiments, the message aggregator 150 may monitor for connectivity with the clients 110 over the network 115. The message aggregator 150 may identify or determine whether each client 110 is connected with the network 115 or the log management system 105 itself. If the connectivity with the client 110 is unavailable, the message aggregator 150 may continue monitoring for connectivity between the client 110 and the log management system 105. On the other hand, if the connectivity with the client 110 is available, the message aggregator 150 may send a request to the client 110 to send the message 210 to the log management system 105. The message generator 135 on the client 110 may send and return the message 210. In each received message 210, the measured times such as the event generation time 208 and the transmission 216 may be determined in accordance with the clock 125 on the client 110. As such, the currently indicated times may differ among the clients 110 in the system 100, as well as differ from the time maintained by the clock 165 on the log management system 105.

Figure 2C:
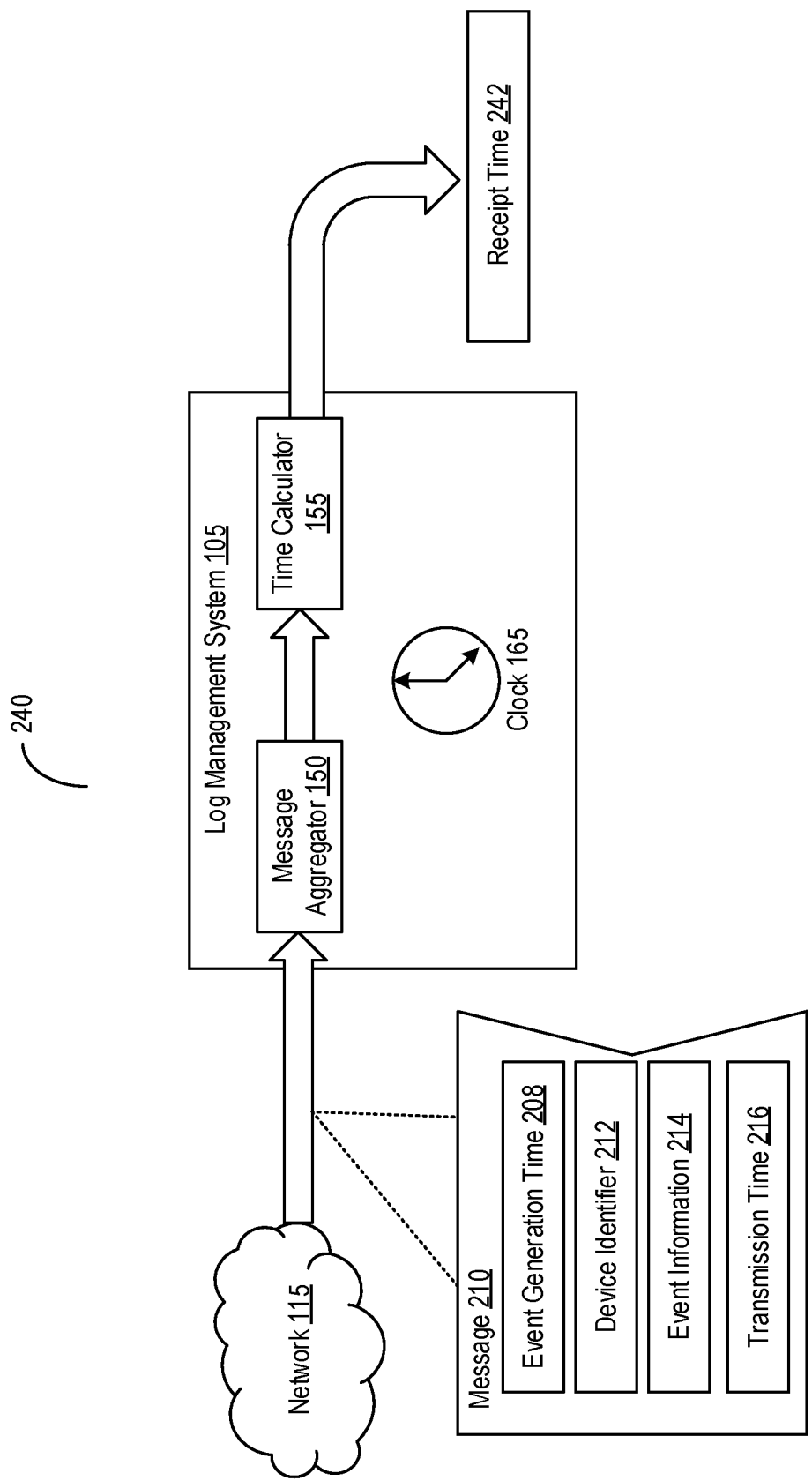
FIG. 2C depicts a block diagram of a process for parsing messages in the system for determining times of events in accordance with an illustrative embodiment.

Referring now to FIG. 2C, among others, depicted is a block diagram of a process 240 for parsing messages in the system 100 for determining times of events. The process 240 may correspond to operations in the system 100 for initial processing of the received messages. Under the process 240, the message aggregator 150 may process or parse each received message 210 from the respective client 110. From parsing the message 210, the message aggregator 150 may extract or identify: the event generation time 208 corresponding to the generation of the event 206 on the client 110; the device identifier 212 referencing the client 110; the event information 214 associated with the event 206; and the transmission time 216 corresponding to the sending of the message 210. Both the event generation time 208 and the transmission time 216 may have been determined using the clock 125 of the client 110, and as such may differ from the times relative to the clock 165 of the log management system 105.

The time calculator 155 executing on the log management system 105 may maintain the clock 165 to keep track of time at the log management system 105. In some embodiments, the clock 165 may be, for example, an electronic oscillator, a programmable interval timer (PIT), or a crystal oscillator, among others on or accessible to the log management system 105. The time calculator 155 may maintain and update the clock 165 using the time from a central time server communicatively coupled with the network 115. In some embodiments, the log management system 105 may be the time server itself (e.g., for the applications 120 installed across the clients 110 in the system 110). The clock 165 may maintain and keep track of the time for the time server. The time maintained by the clock 165 on the log management system 105 may differ from the time maintained by the clock 125 on the client 110. The clock 165 may be synchronized more frequently with the time server or may be part of the time server itself. In contrast, the clock 125 on the client 110 may be less frequently synchronized with the time server, and may become more inaccurate and imprecise especially when the client 110 is not connected with the network 115. As a result, the time measured on the clock 165 on the log management system 105 may be more accurate and precise than the time measured using the clock 125 on the client 110.

Upon receipt of the message 210, the time calculator 155 may use the clock 165 on the log management system 105 to calculate, determine, or identify a receipt time 242. The receipt time 242 may correspond to the receipt of the message 210 at the log management system 105. In some embodiments, the time calculator 155 invoke the clock 165 to retrieve or identify the current time, with receipt of the message 210. The time calculator 155 may use the identified time as the receipt time 242 corresponding to the receipt of the message 210 at the log management system 105. The receipt time 242 may be a timestamp in any format, such as the one used by the clock 125 of the client 110. For example, the timestamp for the receipt time 242 may be in accordance with the ISO 8601 format. With the identification, the time calculator 155 may store and maintain an association between the receipt time 242 and the message 210 received from the client 110.

In some embodiments, the time calculator 155 may convert the event generation time 208 and the transmission time 216 from the original time zone as used by the clock 125 of the client 110 to the time zone used by clock 165 of the log management system 105. The time calculator 155 may identify the time zone used by the clock 125 of the client 110 from the timestamps for the event generation time 208 and the transmission time 216. In conjunction, the time calculator 155 may identify the time zone used by the clock 165 of the log management system 105 (e.g., from the time stamp of the current time). The time calculator 155 may calculate or determine a difference between the time zone used by the clock 125 of the client 110 and the time zone used by the clock 165 of the log management system 105. The difference may correspond to a number of hours, minutes, or seconds that the two time zones differ. Using the difference, the time calculator 155 may offset, shift, or otherwise change the event generation time 208 and the transmission time 216. By offsetting, the event generation times 208 and the transmission times 216 received from multitude of clients 110 may be normalized to the time zone used by the clock 165 of the log management system 105.

Figure 2D:
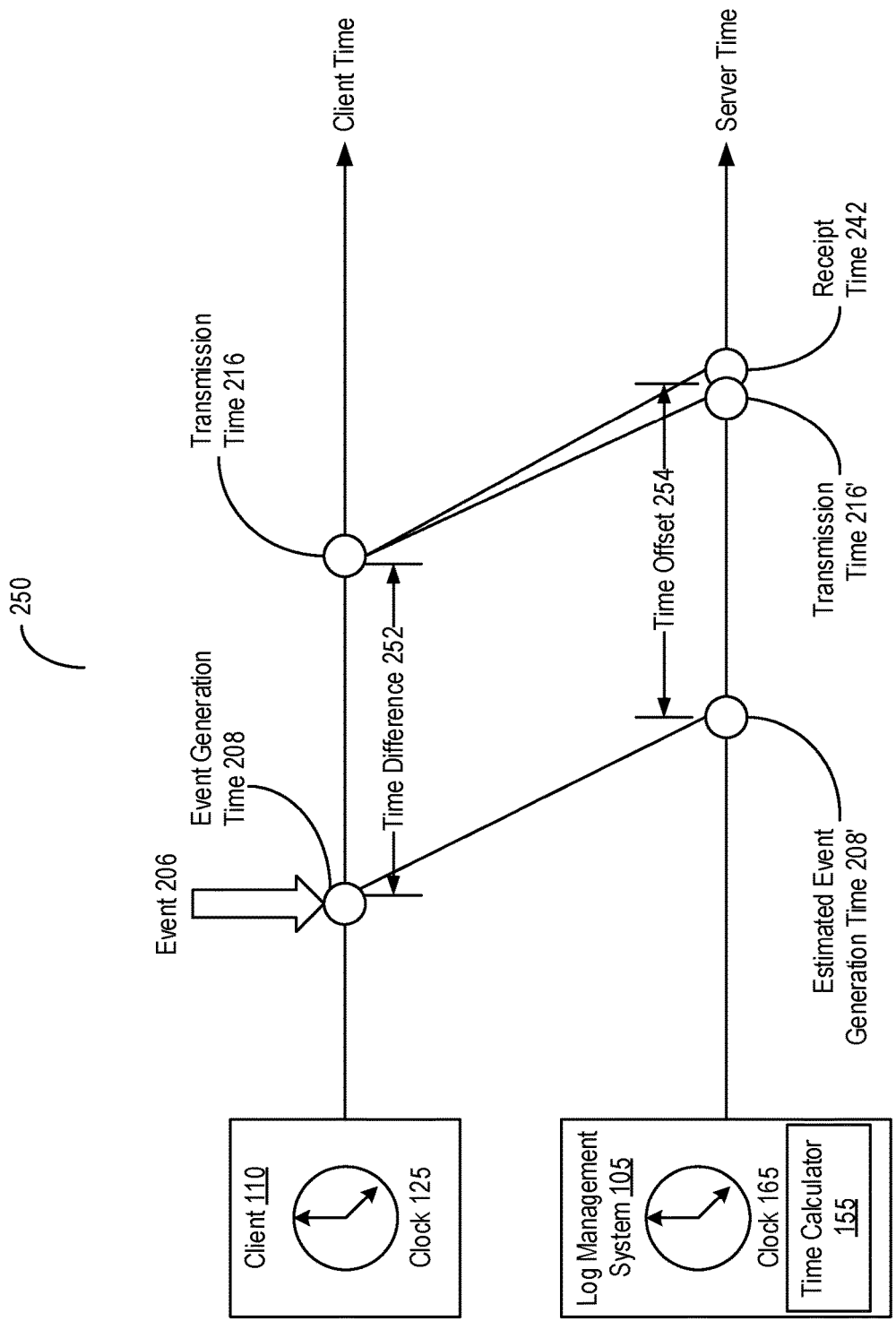
FIG. 2D depicts a block diagram of a process for estimating event generation times in the system for determining times of events in accordance with an illustrative embodiment.

Referring now to FIG. 2D, among others, depicted is a block diagram of a process 250 for estimating event generation times in the system for determining times of events. The process 250 may correspond to operations in the system 100 for estimating the times of events at the client 110. Under the process 250, the time calculator 155 may calculate, identify, or otherwise determine an estimated event generation time 208' in accordance with the clock 165 of the log management system 105, for each received message 210. The estimated event generation time 208' may correspond to the generation of the event 210 at the client 110 as measured by the clock 165 on the log management system 105. The determination of estimated event generation time 208' may be based on: the event time generation time 208 as determined using the clock 125 on the client 110, the transmission time 216 as determined also using the clock 125 on the client 110, and the receipt time 242 as determined using the clock 165 on the log management system 105.

In some embodiments, the time calculator 155 may also identify determine the transmission time 216' in accordance with the clock 165 on the log management system 105. The transmission time 216' may correspond to the transmission of the message 210 as measured using the clock 165 of the log management system 105. To determine the transmission time 216', the time calculator 155 may identify or determine a latency induced by the network 115. The latency may be measured, for example, using round-trip time (RTT) between the log management system 105 and the client 110 over the network 115. The RTT may be determined from previous communications between the log management system 105 and the client 110 running the application 120. For example, the RTT may be measured when establishing a communication session between the log management system 105 and the client 110. The time calculator 155 may use half the value of the RTT as an offset for determining the transmission time 216'. Using the determined offset from latency and the receipt time 242, the time calculator 155 may calculate or determine the transmission time 216'. For example, the time calculator 155 may subtract the offset from the receipt time 242 to calculate the transmission time 216'.

In determining, the time calculator 155 may calculate or determine a time difference 252 between the event generation time 208 and the transmission time 216. The time difference 252 may correspond to an amount of time elapsed between the event generation time 208 and the transmission time 216. As the time difference 252 does not depend on the idiosyncrasies particular to the clock 125 on the client 110, the time difference 252 may be used to calculate the estimated event generation time 208'. With the determination, the time calculator 155 may use the time difference 252 as a time offset 242. The time offset 242 may be relative to the receipt time 242 or the estimated transmission time 216'. Based on the time offset 242 and the receipt time 242, the time calculator 155 may calculate or determine the estimated event generation time 208'. For example, the time calculator 155 may subtract the time offset 242 from the receipt time 242 to produce the estimated event generation time 221'. In some embodiments, the time calculator 155 may use the time offset 242 and the estimated transmission time 216' to calculate or determine the estimated event generation time 208'. The time calculator 155 may repeat the determinations of estimated event generations times 208' across multiple messages 210.

In some embodiments, the time calculator 155 may send, provide, or transmit the receipt time 242 to the client 110 for the client 110 to determine the estimated event generation time 208'. The event detector 130 may perform a determination of the estimated event generation time 208' similar to the determination performed by the time calculator 155 on the log management system 105. The receipt time 242 may be provided via a message to the client 110. Using the receipt time 242, the event detector 130 on the client 110 may calculate, determine, or otherwise identify the estimated event generation time 208' in a similar manner as the time calculator 155. As the receipt time 242 is determined using the clock 165 on the log management system 105, the estimated event generation time 208' determined on the client 110 may also be in accordance with the clock 165 of the log management system 105. The event detector 130 may determine the estimated event generation time 208' based on: the event time generation time 208 as determined using the clock 125 on the client 110, the transmission time 216 as determined also using the clock 125 on the client 110, and the receipt time 242.

In determining, the event detector 130 may determine the time difference 252 between the event generation time 208 and the transmission time 216. The time difference 252 may correspond to an amount of time elapsed between the event generation time 208 and the transmission time 216. With the determination, the event detector 130 may use the time difference 252 as a time offset 242. The time offset 242 may be relative to the receipt time 242. Based on the time offset 242 and the receipt time 242, the event detector 130 may calculate or determine the estimated event generation time 208'. For example, the event detector 130 may subtract the time offset 242 from the receipt time 242 to produce the estimated event generation time 221'. The event detector 130 may repeat the determinations of estimated event generations times 208' across multiple messages 210. The event detector 130 may store the estimated event generation time 208' locally (e.g., on a data storage). In some embodiments, the event detector 130 may store an association between the estimated event generation time 208' and the corresponding event 206.

Figure 2E:
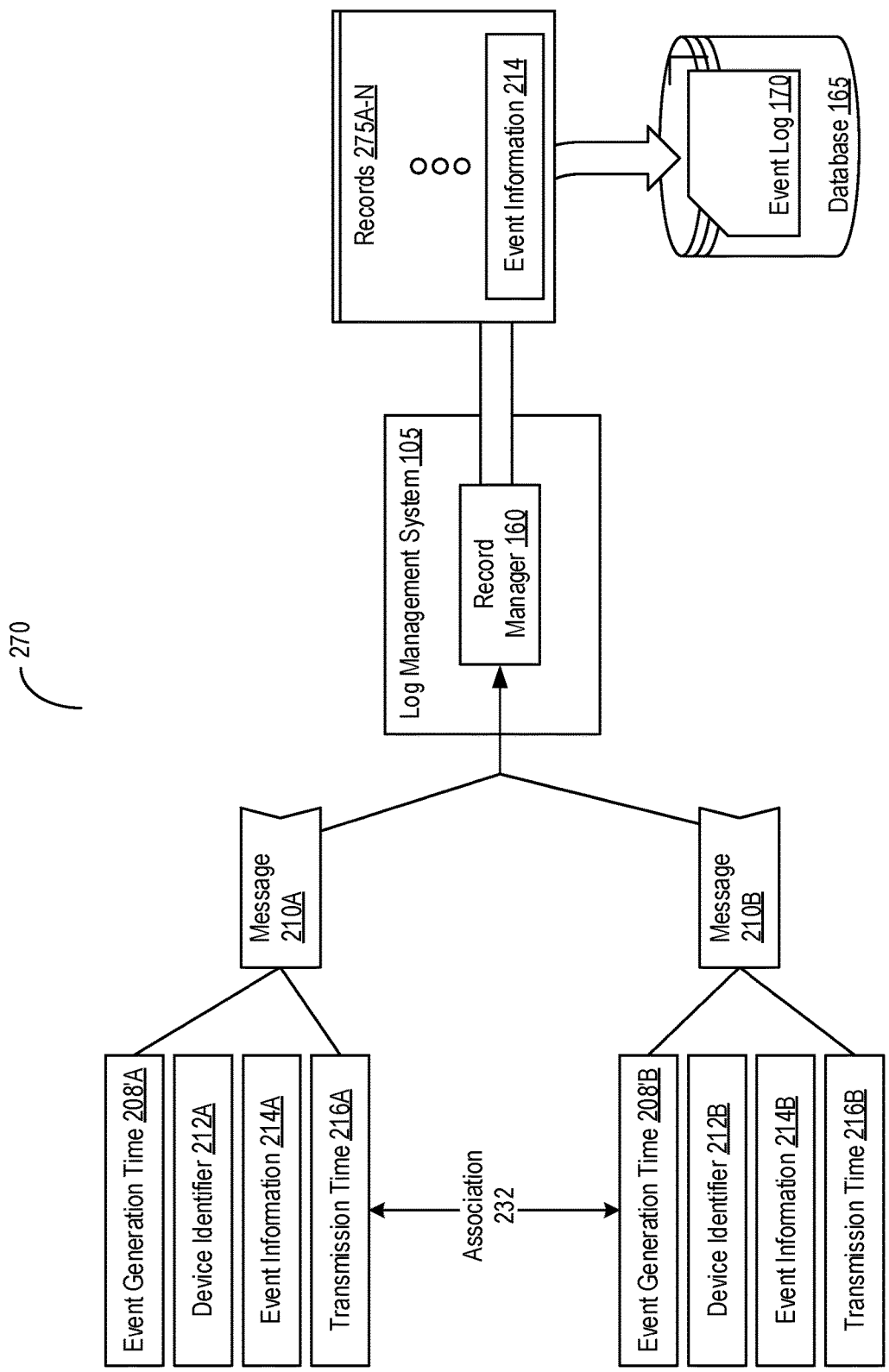
FIG. 2E depicts a block diagram of a process for resolving records in the system for determining times of events in accordance with an illustrative embodiment.

Referring now to FIG. 2E, among others, depicted is a block diagram of a process 270 for resolving records in the system for determining times of events. The process 270 may correspond to operations in the system 100 for resolving messages and events. Under the process 270, the record manager 160 executing on the log management system 105 may produce, output, or generate at least one record 275A-N (hereinafter generally referred to as a record 275) using the received message 210 for storage on the database 165. Each record 275 may identify or include at least a portion of contents of the message 210, such as the device identifier 212 and the event information 214, among others. The record 275 may also identify or include the event generation time 208' determined using the clock 165 of the log management system 105. The record 275 may be generated using one or more data structures (e.g., a linked list, an array, a matrix, a heap, a table, tree node, or other object) for storage in to the database 165. The records 275 on the database 165 may be maintained and administered by the record manager 160 in accordance with a database management system (DBMS). The data structures may associate the contents of the record 275 with one another, such as the device identifier 212, the event information 214, and the estimated event generation time 208', among others.

In some embodiments, the record manager 160 may store the record 275 in the event log 170 maintained on the database 165. The database 165 may store and maintain one or more event logs 170. Each event log 170 may be associated with a particular user 202 or client 110, and may include one or more records 275 for the user 202 or client 110. The event log 170 may be maintained using one or more data structures (e.g., a linked list, an array, a matrix, a heap, a table, tree node, or other object) on the database 165. In some embodiments, the event log 170 may be maintained and administered by the record manager 160 in accordance with a database management system (DBMS). Using the device identifier 212 from the message 210, the record manager 160 may access the database 165 to find or identify the event log 170 associated with the client 110 or the user 202. With the identification, the record manager 160 may add, insert, or otherwise include the record 275 to the event log 170 maintained on the database 165. In some embodiments, the record manager 160 may associate the newly generated record 275 with the other records 275 in the event log 170 on the database 165.

With the receipt of multiple messages 210, the record manager 160 may determine whether to resolve the records 275 for the corresponding events 206. In some embodiments, the record manager 160 may receive a request to resolve the corresponding events 206. The request may be from an administrator of the log management system 105 or of the application 120. The request may identify a user whose messages 210 or records 275 are to be resolved (e.g., using the account identifier for the user). In some embodiments, the request may identify the lesson carried out by the user. In some embodiments, the request may identify the client 110 upon which the events 206 are generated. Upon receipt, the record manager 160 may identify the records 275 (or messages 210) using the request. For example, when the request identifies a particular user and lesson, the record manager 160 may identify messages 210 with the user and the lesson based on the event information 214 of the messages 210. By having the request sent, the log management system 105 may bifurcate the calculation of the event generation times 208' and the resolution of the events corresponding to the messages 210 and by extension records 275. In some embodiments, the record manager 160 may normalize the event generation times 208' to a time zone upon of the log management system 105 upon receipt of the request (e.g., in a similar manner as discussed above). With the identification, the record manager 160 may perform the determination of whether to resolve.

In determining, the record manager 160 may determine whether the association 232 exists between the clients 110 (e.g., the first client 110A and the second client 110B) from which the messages 210 are received (e.g., the first message 210A and the second message 210B). In some embodiments, the record manager 160 may determine whether the association 232 between the received messages 210 corresponding to the events 206 generated on the respective clients 110. As discussed above, the association 232 may indicate the user 202 is using the applications 120 on the two clients 110, and may exist between the clients 110, the events 206 (e.g., performed for the same routine or lesson), or the messages 210, among others. To determine whether the association 232 exists, the record manager 160 may compare at least a portion of the event information 214 from one message 210 with at least a portion the event information 214 from the other message 210.

In some embodiments, the record manager 160 may determine whether the messages 210 are duplicative using the event information 214 from the messages 210. When messages 210 are duplicative, the messages 210 may be referring to the same event 206. To determine, the record manager 160 may compare the hash values 224 of each message 210 with one another. If the hash values 224 do not match, the record manager 160 may determine that the corresponding messages 210 with the hash values 224 are not duplicates. The record manager 160 may also proceed to determine whether the association 232 exists among the messages 210. On the contrary, if the hash values 224 match, the record manager 160 may determine that the corresponding messages 210 with the hash values 224 are duplicates. The record manager 160 may also select at least one message 210 for additional processing, and ignore the remaining messages 210.

The record manager 160 may determine whether the association 232 exists based on the comparison of the event information 214 from the multiple messages 210 may be a comparison between the event keys 218. When the event information 214 from the multiple messages 210 are identified as not corresponding with one another, the record manager 160 may determine that the association 232 does not exist between the corresponding clients 110, the events 206, or the messages 210. In some embodiments, when the event keys 218 are identified as not matching, the record manager 160 may determine that the association 232 do not exist. Based on this determination of lack of the association 232, the record manager 160 may determine that the events 206 associated with the messages 210 do not correspond to a routine of a lesson performed by the same user 202. For example, the event key 218 in the event information 214A in the first message 210A may indicate that the event 206 was generated in response to the user 202 performing a breathing exercise for smoke cessation lesson. In contrast, the event key 218 in the event information 214B of the second message 210B may indicate that the event 206 was generated when another user 202 performs a water drinking routine as part of the alcohol consumption lesson. In addition, the record manager 160 may determine that the records 275 for messages 210 or the corresponding events 206 are to be not resolved. The record manager 160 may store separate records 275 (e.g., generated as discussed above) onto the database 165.

Conversely, when the event information 214 from the multiple messages 210 are identified as corresponding with one another, the record manager 160 may determine that the association 232 does exist between the corresponding clients 110, the events 206, or the messages 210. In some embodiments, when the event keys 218 are identified as matching, the record manager 160 may determine that the association 232 does exist. Based on this determination of existence of the association 232, the record manager 160 may determine that the events 206 leading to the transmission of the messages 210 correspond to a routine of a lesson performed by the same user 202. For example, the event key 218 in the event information 214A in the first message 210A may indicate that the event 206 was generated in response to the user 202 performing a breathing exercise for dietary lesson. In contrast, the event key 218 in the event information 214B of the second message 210B may indicate that the event 206 was generated when the same user 202 performs a water drinking routine as part of the dietary lesson or another lesson. The event key 218 from the first message 210A and the event key 218 from the second message 210B may be the same, indicating that the events were performed by the same user for the same lesson. The first message 210A and the second message 210B may be related to the determination of the event generation time 208'A and 208'B, as the order in which the corresponding events may be of interest.

With the identification of the existence of the association 232, the record manager 160 may determine to resolve that the records 275 for the messages 210 and the corresponding events 206 are to be resolved. Upon the determination, the record manager 160 may identify or determine a sequence for the corresponding events 206 of the messages 210 based on the estimated event generation time 208' for each event 206. The sequence may identify or define an order of the generation of the events 206 at the clients 110 in accordance with the estimated event generation times 208' determined using the clock 165 of the log management system 105. For example, the user 202 may have recorded the performance of a water drinking routine as part of a smoke cession lesson on the first client 110A, and then the performance of a breathing exercise as part of the same lesson on the second client 110B. However, the event generation times 208 or the transmission times 216 as measured by the clocks 125 on the client 110 may indicate that the completion of the breathing exercise as occurring prior to the water drinking routine. By using the clock 165 on the log management system 105 to calculate the time offset 254, the estimated event generated times 208' may correctly identify that the completion of the breathing exercise as occurring after the water drinking routine. With the determination, the record manager 160 may store and maintain the records 275 for these messages 210 in accordance with the sequence on the event log 170. In some embodiments, the record manager 160 may store an association between the records 275 and the determined sequence on the database 165.

In some embodiments, the record manager 160 may identify or determine a precedence for resolution between the events 206 corresponding to the records 275 based on the estimated event generation times 208'. The determination of the precedence may be in response to identifying that the event keys 218 in the event information 214 of the messages 210 are matching. When the event keys 218 match, this may indicate that the same routine in the same lesson was performed by the same user 202. The precedence for resolution may identify or define which record 275 is to be stored on the event log 170 for the user 202 or client 110 on the database 165. In some embodiments, the precedence may specify that the record 275 corresponding to the event 206 with the earlier estimated event generation time 208' is to be stored on the database 165, and the records 275 discarded. In some embodiments, the precedence may specify that the record 275 corresponding to the event 206 with the later estimated event generation time 208' is to be stored on the database 165, and the other records 275 discarded. In accordance with the precedence, the record manager 160 may identify or select one of the records 275, and may store the record 275 in the event log 170.

In some embodiments, the record manager 160 may send, provide, or transmit one or more records 275 to another client 110 identified as having the association 232 with the client 110 that sent the message 210. From receiving multiple messages 210, the record manager 160 may identify two or more clients 110 as having the association 232. For example, as discussed above, the user 202 may be logged onto the application 120 on each client 110 using the same authentication information (e.g., account identifier and passcode), and may operating the application 120 on multiple client 110 at a given time. In conjunction with the storage onto the database 165, the record manager 160 may identify one or more other clients 110 associated with the client 110 from which the message 210 was received. With the identifications, the record manager 160 may send at least a portion of the record 275 (e.g., the event generation time 208' and the event information 214) to the other client 110. In the above example, the record manager 160 may identify that the second client 110B is associated with the first client 110A from which the message 210A was received, via the same user 202. Upon receipt, the application 120 on the client 110 may present one or more contents of the record 275 via the user interface 140.

In some embodiments, the event detector 130 on client 110 may perform the above described functions of the record manager 160 on the log management system 105. As discussed above, the event detector 130 may determine the estimated event generation times 208' using the receipt time 242. In some embodiments, the event detector 130 on the client 110 may retrieve, identify, or receive multiple records 275 or messages 210 corresponding to multiple events 206 from the log management system 105. The retrieval may be in response to a request to resolve the events 206. Using the estimated event generation times 208', the event detector 130 may resolve corresponding events 206. In some embodiments, the event detector 130 may identify multiple events 206 as having the association 232 (e.g., performance of routines for the same behavioral condition). With the identification, the event detector 130 may identify or determine a sequence for the corresponding events 206 based on the estimated event generation time 208' for each event 206. The sequence may identify or define an order of the generation of the events 206 in accordance with the estimated event generation times 208' determined using the clock 165 of the log management system 105. In some embodiments, the event detector 130 may identify or determine a precedence for resolution between the events 206 corresponding to the records 275 based on the estimated event generation times 208'. In some embodiments, the event detector 130 may store an association between the events 206 and the sequence or precedence on a local data storage.

In this manner, by using the clock 165 rather than relying on the measurements using the clocks 125 of individual clients 110, the log management system 105 may be able to generate more accurate and precise event generation times 208' for the events 206. Using the estimated event generation times 208', the log management system 105 may also be able to properly resolve associated events 206. With the inclusion of the estimated event generation times 208', the records 275 stored on the database 165 may be more reliable and useful, facilitating greater confidence in the evaluation and assessment of routines and lessons provided via the applications 120. Using the records 275, an administrator of a digital therapeutics application (such as the application 120) may be able to better analyze how effective the routines of the lessons are in addressing behavioral conditions of users 202, and reconfigure the applications accordingly. These updates in turn may reduce the consumption of computing resources and network bandwidth at the clients 110, such as those used on presenting lessons via the applications 120 identified as ineffective. In addition, the reconfigurations may increase the quality of human-computer interactions (HCI) between the user 202 and the application 120.

Figure 3:
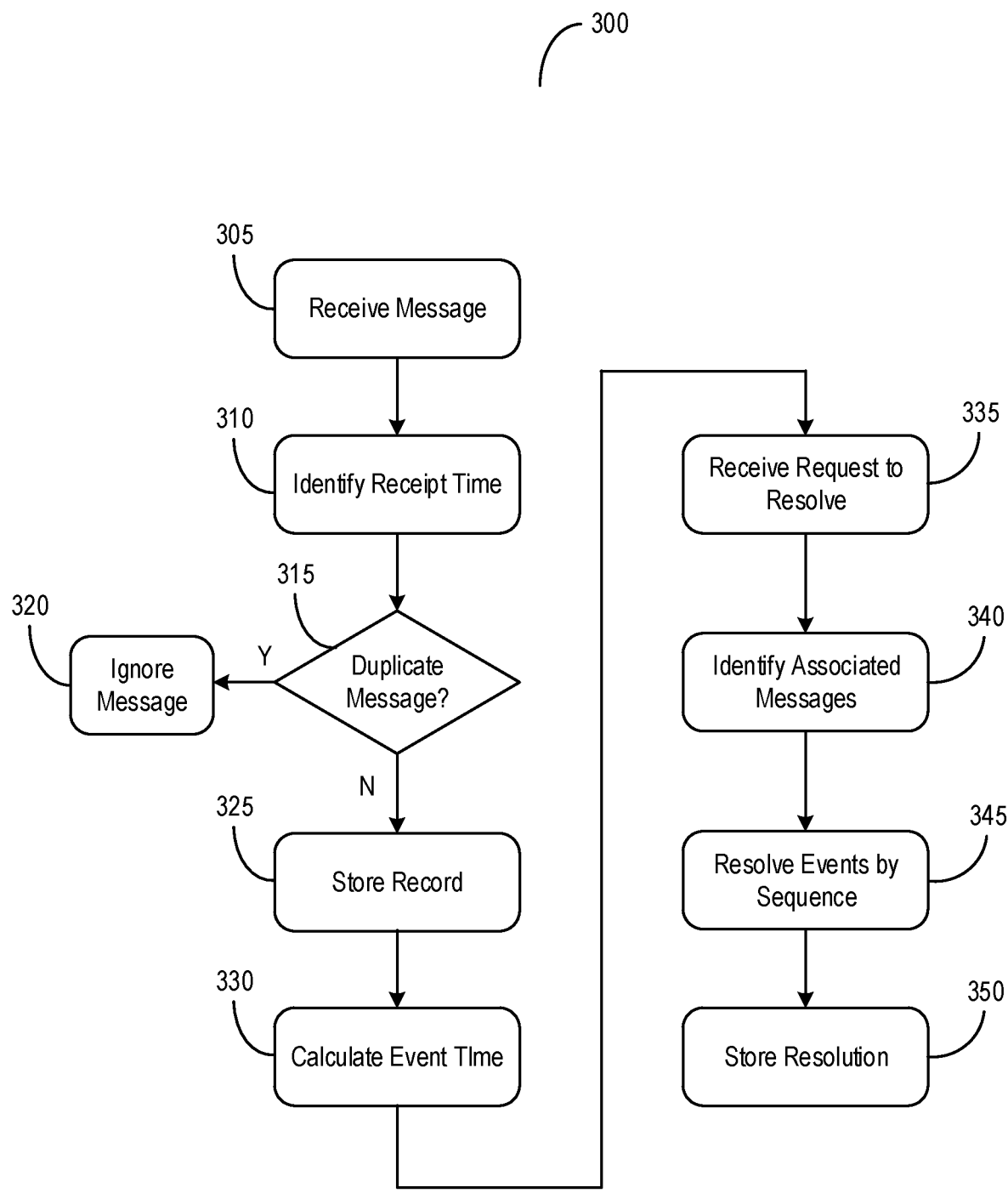
FIG. 3 depicts a flow diagram of a method of determining times of events generated on clients in accordance with an illustrative embodiment.

Referring now to FIG. 3 depicts a flow diagram of a method 300 of determining times of events generated on clients. The method 300 may be implemented using any of the components as detailed herein above in conjunction with FIG. 1-2E or 4. Under method 300, a server (e.g., the log management system 105) may receive a message (e.g., the message 210) from a client (e.g., the client 110) (305). The server may identify receipt time (e.g., the receipt time 242) for the message (310). The server may determine whether received message is a duplicate of another message based on hash values (e.g., the hash value 224) of the message (315). If the message is determined to be duplicative, the server may ignore the message (320). Otherwise, if the message is determined to be not duplicative, the server may store a record (e.g., the record 275) (325). The server may also calculate an event time (e.g., the estimated event generation time 208') for each message (330). The server may receive a request to resolve (335). Upon receipt, the server may identify associated messages (e.g., two or more messages 210 having the association 232) (340). The server may resolve the events based on the sequence of the event times (345). The server may store records in accordance with the resolution (e.g., association between the events and the sequence) (350).

B. Network and Computing Environment

Figure 4:
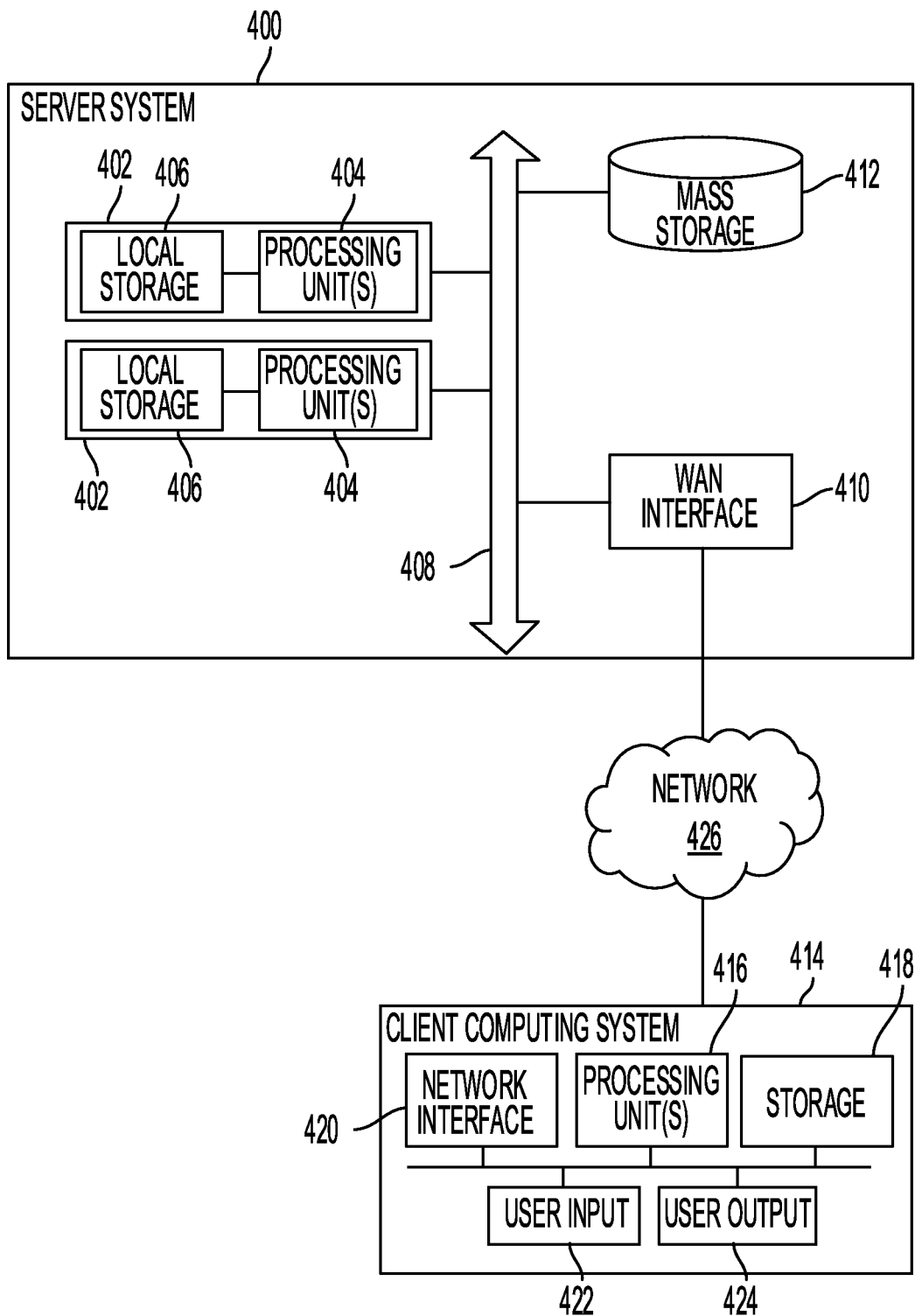
FIG. 4 is a block diagram of a server system and a client computer system in accordance with an illustrative embodiment.

Various operations described herein can be implemented on computer systems. FIG. 4 shows a simplified block diagram of a representative server system 400, client computer system 414, and network 426 usable to implement certain embodiments of the present disclosure. In various embodiments, server system 400 or similar systems can implement services or servers described herein or portions thereof. Client computer system 414 or similar systems can implement clients described herein. The system 100 described herein can be similar to the server system 400. Server system 400 can have a modular design that incorporates a number of modules 402 (e.g., blades in a blade server embodiment); while two modules 402 are shown, any number can be provided. Each module 402 can include processing unit(s) 404 and local storage 406.

Processing unit(s) 404 can include a single processor, which can have one or more cores, or multiple processors. In some embodiments, processing unit(s) 404 can include a general-purpose primary processor as well as one or more special-purpose co-processors such as graphics processors, digital signal processors, or the like. In some embodiments, some or all processing units 404 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 404 can execute instructions stored in local storage 406. Any type of processors in any combination can be included in processing unit(s) 404.

Local storage 406 can include volatile storage media (e.g., DRAM, SRAM, SDRAM, or the like) and/or non-volatile storage media (e.g., magnetic or optical disk, flash memory, or the like). Storage media incorporated in local storage 406 can be fixed, removable, or upgradeable as desired. Local storage 406 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 404 need at runtime. The ROM can store static data and instructions that are needed by processing unit(s) 404. The permanent storage device can be a non-volatile read-and-write memory device that can store instructions and data even when module 402 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 406 can store one or more software programs to be executed by processing unit(s) 404, such as an operating system and/or programs implementing various server functions such as functions of the system 100 or any other system described herein, or any other server(s) associated with system 100 or any other system described herein.

"Software" refers generally to sequences of instructions that, when executed by processing unit(s) 404, cause server system 400 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 404. Software can be implemented as a single program or a collection of separate programs or program modules that interact as desired. From local storage 406 (or non-local storage described below), processing unit(s) 404 can retrieve program instructions to execute and data to process in order to execute various operations described above.

In some server systems 400, multiple modules 402 can be interconnected via a bus or other interconnect 408, forming a local area network that supports communication between modules 402 and other components of server system 400. Interconnect 408 can be implemented using various technologies including server racks, hubs, routers, etc.

A wide area network (WAN) interface 410 can provide data communication capability between the local area network (e.g., through the interconnect 408) and the network 426, such as the Internet. Other technologies can be used to communicatively couple the server system 410 with the network 426, including wired (e.g., Ethernet, IEEE 802.3 standards) and/or wireless technologies (e.g., Wi-Fi, IEEE 802.11 standards).

In some embodiments, local storage 406 is intended to provide working memory for processing unit(s) 404, providing fast access to programs and/or data to be processed while reducing traffic on interconnect 408. Storage for larger quantities of data can be provided on the local area network by one or more mass storage subsystems 412 that can be connected to interconnect 408. Mass storage subsystem 412 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 412. In some embodiments, additional data storage resources may be accessible via WAN interface 410 (potentially with increased latency).

Server system 400 can operate in response to requests received via WAN interface 410. For example, one of modules 402 can implement a supervisory function and assign discrete tasks to other modules 402 in response to received requests. Work allocation techniques can be used. As requests are processed, results can be returned to the requester via WAN interface 410. Such operation can generally be automated. Further, in some embodiments, WAN interface 410 can connect multiple server systems 400 to each other, providing scalable systems capable of managing high volumes of activity. Other techniques for managing server systems and server farms (collections of server systems that cooperate) can be used, including dynamic resource allocation and reallocation.

Server system 400 can interact with various user-owned or user-operated devices via a wide-area network such as the Internet. An example of a user-operated device is shown in FIG. 4 as client computing system 414. Client computing system 414 can be implemented, for example, as a consumer device such as a smartphone, other mobile phone, tablet computer, wearable computing device (e.g., smart watch, eyeglasses), desktop computer, laptop computer, and so on.

For example, client computing system 414 can communicate via WAN interface 410. Client computing system 414 can include computer components such as processing unit(s) 416, storage device 418, network interface 420, user input device 422, and user output device 424. Client computing system 414 can be a computing device implemented in a variety of form factors, such as a desktop computer, laptop computer, tablet computer, smartphone, other mobile computing device, wearable computing device, or the like.

Processor 416 and storage device 418 can be similar to processing unit(s) 404 and local storage 406 described above. Suitable devices can be selected based on the demands to be placed on client computing system 414; for example, client computing system 414 can be implemented as a "thin" client with limited processing capability or as a high-powered computing device. Client computing system 414 can be provisioned with program code executable by processing unit(s) 416 to enable various interactions with server system 400.

Network interface 420 can provide a connection to the network 426, such as a wide area network (e.g., the Internet) to which WAN interface 410 of server system 400 is also connected. In various embodiments, network interface 420 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 422 can include any device (or devices) via which a user can provide signals to client computing system 414; client computing system 414 can interpret the signals as indicative of particular user requests or information. In various embodiments, user input device 422 can include any or all of a keyboard, touch pad, touch screen, mouse or other pointing device, scroll wheel, click wheel, dial, button, switch, keypad, microphone, and so on.

User output device 424 can include any device via which client computing system 414 can provide information to a user. For example, user output device 424 can include display-to-display images generated by or delivered to client computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 424 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 404 and 416 can provide various functionality for server system 400 and client computing system 414, including any of the functionality described herein as being performed by a server or client, or other functionality.

It will be appreciated that server system 400 and client computing system 414 are illustrative and that variations and modifications are possible. Computer systems used in connection with embodiments of the present disclosure can have other capabilities not specifically described here. Further, while server system 400 and client computing system 414 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished; e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or digital versatile disk (DVD), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of determining times of events, comprising:
receiving, by a server, a first message from a first client in response to a first event, the first message identifying a first time corresponding to a generation of the first event and a second time corresponding to transmission of the first message, the first time and the second time determined using a first clock of the first client;
identifying, by the server, using a second clock of the server, a third time at which the first message is received at the server;
determining, by the server, a fourth time based at least on the first time, the second time, and the third time, the fourth time identifying a time according to the second clock at which the first event was generated at the first client;
storing, by the server, on a database, a record identifying the first client and the first event; and
providing, by the server, a second message to a second client associated with the first client, the second message identifying the first event and the fourth time.

2. The method of claim 1, further comprising determining, by the server, for a third message in response to a second event from the second client associated with the first client, based at least on (i) a fifth time corresponding to a generation of the second event according to a third clock of the second client, (ii) a sixth time corresponding to transmission of the third message according to the third clock, and (iii) a seventh time at which the third message is received at the server determined using the second clock, an eighth time identifying a time according to the second clock at which the second event was generated at the second client.

3. The method of claim 2, further comprising determining, by the server, a sequence of the first event and the second event based at least on (i) the fourth time and (ii) the eighth time according to the second clock.

4. The method of claim 2, further comprising storing, by the server, in a log for the first client on the database, a second record identifying the second client, the second event, and the eighth time, responsive to an association between the first client and the second client.

5. The method of claim 2, further comprising determining, by the server, a precedence for resolution between the first event and the second event based at least on the fourth time and the eighth time, responsive to identifying that the first message and the third message as having a matching key.

6. The method of claim 1, further comprising:
receiving, by the server, third message in response to a third event from the second client associated with the first client; and
identifying, by the server, the first event and the third event as corresponding to a routine, responsive to the first message and the third message having a matching key for the routine.

7. The method of claim 1, wherein receiving the first message further comprises receiving the first message from the first client, responsive to the first client establishing a connection with a network with which the server is communicatively coupled.

8. The method of claim 1, wherein receiving the first message further comprises receiving the first message generated by an application on the first client in response to the first event, the application providing a plurality of routines to address a condition of a user, the first event corresponding to performance of at least one of the plurality of routines.

9. The method of claim 1, wherein the record further identifies a key for the first event, a payload of the first message, a tag associated with the payload, and a hash value generated by the first client for the first event.

10. A system for determining times of events, comprising:
at least one server having one or more processors coupled with memory, the at least one server configured to:
receive a first message from a first client in response to a first event, the first message identifying a first time corresponding to a generation of the first event and a second time corresponding to transmission of the first message, the first time and the second time determined using a first clock of the first client;
identify, using a second clock of the at least one server, a third time at which the first message is received at the at least one server;
determine a fourth time based at least on the first time, the second time, and the third time, the fourth time identifying a time according to the second clock at which the first event was generated at the first client;
store, on a database, a record identifying the first client and the first event; and
provide a second message to a second client associated with the first client, the second message identifying the first event and the fourth time.

11. The system of claim 10, wherein the at least one server is further configured to determine, for a third message in response to a second event from the second client associated with the first client, based at least on (i) a fifth time corresponding to a generation of the second event according to a third clock of the second client, (ii) a sixth time corresponding to transmission of the third message according to the third clock, and (iii) a seventh time at which the third message is received at the at least one server determined using the second clock, an eighth time identifying a time according to the second clock at which the second event was generated at the second client.

12. The system of claim 11, wherein the at least one server is further configured to determine a sequence of the first event and the second event based at least on (i) the fourth time and (ii) the eighth time according to the second clock.

13. The system of claim 11, wherein the at least one server is further configured to store, in a log for the first client on the database, a second record identifying the second client, the second event, and the eighth time, responsive to an association between the first client and the second client.

14. The system of claim 11, wherein the at least one server is further configured to determine a precedence for resolution between the first event and the second event based at least on the fourth time and the eighth time, responsive to identifying that the first message and the third message as having a matching key.

15. The system of claim 10, wherein the at least one server is further configured to:
receive a third message in response to a third event from the second client associated with the first client; and identify the first event and the third event as corresponding to a routine, responsive to the first message and the third message having a matching key for the routine.

16. The system of claim 10, wherein the at least one server is further configured to receive the first message from the first client, responsive to the first client establishing a connection with a network with which the at least one server is communicatively coupled.

17. A method of determining times of events, comprising:
identifying, by a client, in response to an event, a first time corresponding to a generation of the event and a second time corresponding to transmission of a message sent to a server to identify the event, the first time and the second time determined using a first clock of the client;
receiving, by the client, a third time at which the message is received at the server, the third time determined using a second clock of the server;
determining, by the client, a fourth time based at least on the first time, the second time, and the third time, the fourth time identifying a time according to the second clock at which the event was generated at the client; and
storing, by the client, on a database, an association between the event and the fourth time.

18. The method of claim 17, further comprising sending, by the client to the server, a second message identifying the event, the first time, and the second time, responsive to establishing a connection with a network with which the server is communicatively coupled.

19. A method of determining times of events, comprising:
receiving, by a server, a first message from a first client in response to a first event, the first message identifying a first time corresponding to a generation of the first event and a second time corresponding to transmission of the first message, the first time and the second time determined using a first clock of the first client;
identifying, by the server, using a second clock of the server, a third time at which the first message is received at the server;
determining, by the server, a fourth time based at least on the first time, the second time, and the third time, the fourth time identifying a time according to the second clock at which the first event was generated at the first client;
storing, by the server, on a database, a record identifying the first client and the first event;
receiving, by the server, a second message in response to a second event from a second client associated with the first client; and
identifying, by the server, the first event and the second event as corresponding to a routine, responsive to the first message and the second message having a matching key for the routine.

20. The method of claim 19, further comprising determining, by the server, for a third message in response to a third event from the second client associated with the first client, based at least on (i) a fifth time corresponding to a generation of the third event according to a third clock of the second client, (ii) a sixth time corresponding to transmission of the third message according to the third clock, and (iii) a seventh time at which the third message is received at the server determined using the second clock, an eighth time identifying a time according to the second clock at which the third event was generated at the second client.

21. The method of claim 20, further comprising determining, by the server, a sequence of the first event and the third event based at least on (i) the fourth time and (ii) the eighth time according to the second clock.

22. The method of claim 20, further comprising storing, by the server, in a log for the first client on the database, a second record identifying the second client, the third event, and the eighth time, responsive to an association between the first client and the second client.

23. The method of claim 20, further comprising determining, by the server, a precedence for resolution between the first event and the third event based at least on the fourth time and the eighth time, responsive to identifying that the first message and the third message as having the matching key.

24. The method of claim 19, further comprising providing, by the server, a third message to the second client associated with the first client, the third message identifying the first event and the fourth time.

25. The method of claim 19, wherein receiving the first message further comprises receiving the first message from the first client, responsive to the first client establishing a connection with a network with which the server is communicatively coupled.

26. The method of claim 19, wherein receiving the first message further comprises receiving the first message generated by an application on the first client in response to the first event, the application providing a plurality of routines to address a condition of a user, the first event corresponding to performance of at least one of the plurality of routines.

27. The method of claim 19, wherein the record further identifies a key for the first event, a payload of the first message, a tag associated with the payload, and a hash value generated by the first client for the first event.

28. A system for determining times of events, comprising:
at least one server having one or more processors coupled with memory, the at least one server configured to:
receive a first message from a first client in response to a first event, the first message identifying a first time corresponding to a generation of the first event and a second time corresponding to transmission of the first message, the first time and the second time determined using a first clock of the first client;
identify, using a second clock of the at least one server, a third time at which the first message is received at the at least one server;
determine a fourth time based at least on the first time, the second time, and the third time, the fourth time identifying a time according to the second clock at which the first event was generated at the first client;
store, on a database, a record identifying the first client and the first event;
receive a second message in response to a second event from a second client associated with the first client; and
identify the first event and the second event as corresponding to a routine, responsive to the first message and the second message having a matching key for the routine.

29. The system of claim 28, wherein the at least one server is further configured to determine, for a third message in response to a third event from the second client associated with the first client, based at least on (i) a fifth time corresponding to a generation of the second event according to a third clock of the second client, (ii) a sixth time corresponding to transmission of the third message according to the third clock, and (iii) a seventh time at which the third message is received at the at least one server determined using the second clock, an eighth time identifying a time according to the second clock at which the second event was generated at the second client.

30. The system of claim 29, wherein the at least one server is further configured to determine a sequence of the first event and the second event based at least on (i) the fourth time and (ii) the eighth time according to the second clock.

31. The system of claim 29, wherein the at least one server is further configured to store, in a log for the first client on the database, a second record identifying the second client, the second event, and the eighth time, responsive to an association between the first client and the second client.

32. The system of claim 29, wherein the at least one server is further configured to determine a precedence for resolution between the first event and the second event based at least on the fourth time and the eighth time, responsive to identifying that the first message and the second message as having the matching key.

33. The system of claim 28, wherein the at least one server is further configured to provide a third message to the second client associated with the first client, the third message identifying the first event and the fourth time.

34. The system of claim 28, wherein the at least one server is further configured to receive the first message from the first client, responsive to the first client establishing a connection with a network with which the at least one server is communicatively coupled.

35. A system for determining times of events, comprising:
a client having one or more processors coupled with memory, configured to:
identify, in response to an event, a first time corresponding to a generation of the event and a second time corresponding to transmission of a message sent to a server to identify the event, the first time and the second time determined using a first clock of the client;
receive a third time at which the message is received at the server, the third time determined using a second clock of the server;
determine a fourth time based at least on the first time, the second time, and the third time, the fourth time identifying a time according to the second clock at which the event was generated at the client; and
store, on a database, an association between the event and the fourth time.

36. The method of claim 35, wherein the client is further configured to send, to the server, a second message identifying the event, the first time, and the second time, responsive to establishing a connection with a network with which the server is communicatively coupled.

* * * * *